L. WOJIDKOW.
COOKING UTENSIL.
APPLICATION FILED MAR. 3, 1911.
1,091,903.
Patented Mar. 31, 1914.
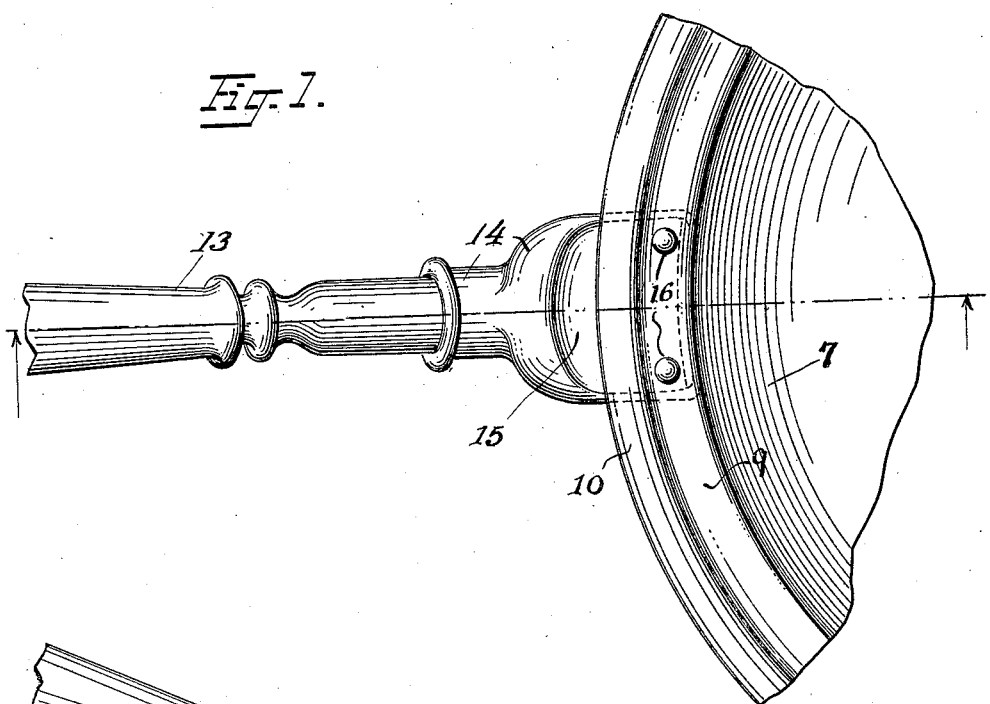
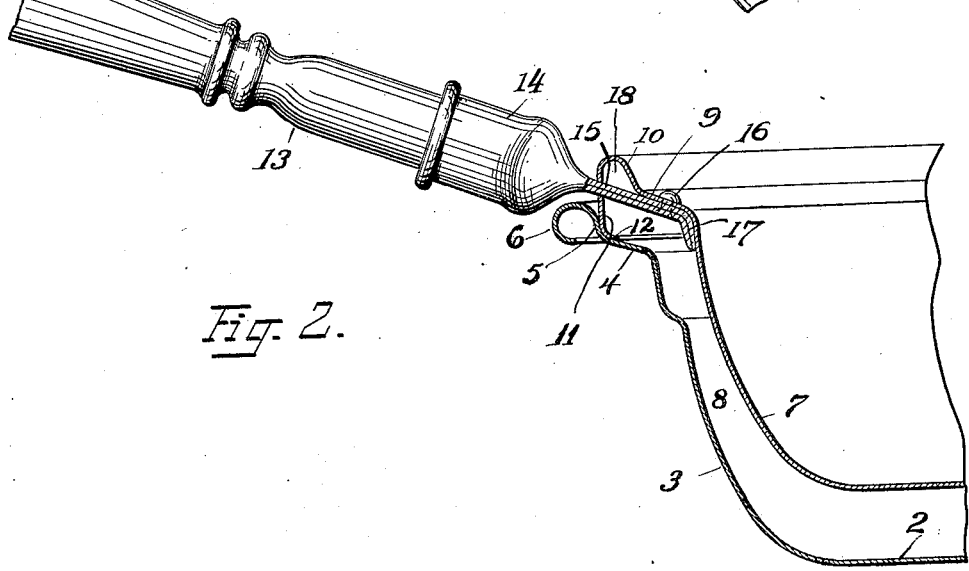
Witnesses:
Louis Wojidkow Inventor
By Attorney

UNITED STATES PATENT OFFICE.

LOUIS WOJIDKOW, OF BROOKLYN, NEW YORK.

COOKING UTENSIL.

1,091,903.  Specification of Letters Patent.  Patented Mar. 31, 1914.

Application filed March 3, 1911. Serial No. 612,098.

*To all whom it may concern:*

Be it known that I, LOUIS WOJIDKOW, a citizen of the United States, residing in Brooklyn, New York, have invented the new and useful Improvements in Cooking Utensils described herein.

The present invention relates to cooking utensils, and more particularly to chafing dishes.

The object of the invention is to provide a secure form of attachment for the handles of dishes or pans so that the rivets or other means for securing the handle will be relieved of strains tending to loosen or break them.

Another object of the invention is to provide a continuous and stable bearing for the food pan of a chafing dish upon the water pan which supports it, so that the one will not rock on the other and the operator's hand will not be scalded by escaping steam.

A further object is to provide a construction and form of food pan which will present greater surface to the heat of the steam and water vapor rising in the water pan, all as will be more fully disclosed by reference to the accompanying drawings in which—

Figure 1 is a broken top plan view of the food pan with handle attached. Fig. 2 is a view in elevation taken on a cross section through the assembled pans at the point of attachment of the food pan handle.

The body of the water pan is shown as of a type having a flat bottom 2 and inclined sides 3. At the top of the pan body is an annular flange, composed of two differently inclined surfaces 4 and 5, and a bead or curled over portion 6. The surface 4 which adjoins the pan body serves as a seat for the food pan. This surface is relatively horizontal but is inclined sufficiently to permit of drainage of water of condensation into the pan body. The surface 5 is a continuation of the surface 4 and surrounds the latter: it is more steeply inclined than the surface 4 and serves to prevent lateral displacement of the food pan when this pan is seated on the water pan. The bead 6, which may be otherwise formed, is a continuation of the surface 5 and is inclined toward the surface 5 and with the latter serves as a guide to the food pan to assist in centering it on its seat.

The food pan has a body portion 7 of such diameter and shape as to provide an annular steam space 8 between the two pans from top to bottom. At its upper end its side wall 7 is offset or flared outward to form an annular flange section 9 which is preferably flat. From the offset 9, the wall of the food pan is turned up more steeply as at 10, and is rolled over at the top to form a seat for the pan cover. Depending from the outer periphery of part 10 is an annular skirt 11, which is preferably vertical and slightly turned at its lower end to provide a surface 12 for seating the food pan on the water pan. In Fig. 2, the turned lower end of the skirt 11 is seated upon the surface 4 of the water pan; and the more deeply inclined part 5 of the water pan is shown as fitting snugly around the skirt to hold the food pan against lateral displacement. The several portions of the food pan above referred to are all preferably integral with the body of the pan.

The handle 13 of the food pan is fitted into a metal ferrule 14 flattened into a shank 15 at one end, which passes through an aperture in the skirt 11 and is secured by rivets 16 to the offset or flange 9 of the food pan. The shank fits, preferably rather closely, within the aperture in the skirt so that there may be no appreciable play between the parts, and also so that steam will not escape at this point. As a matter of preference, the end of the shank is turned or offset as shown at 17 to fit the corner between the side wall 7 and the flange 9 of the food pan, and also to conform to the curve of the side wall, as indicated by the dotted lines of Fig. 2. This arrangement, as will be observed, provides a firm and somewhat extended bearing for the handle shank on the pan.

It follows from the construction described that the handle has two separate points of bearing upon the pan and that the strains which are imparted to the rivets are such as can be most effectively resisted by them, while lateral strains exerted by the handle are resisted by portions of the pan which are not liable to distortion thereunder.

The seat 4 and the turned end 12 of the skirt are continuous annular surfaces, uninterrupted by any handle attaching means, and forming a substantially steam tight joint.

It will be noted that the skirt 11 forms, with the flange members 9 and 10, a chamber 18, opening into the steam space 8, and in effect continuing the steam space to the upper and outer periphery of the food pan flange. This flange is therefore heated directly by the steam, instead of being cut off from the steam as in those structures in which the food pan flange is seated directly upon the water pan.

Claims—

1. A chafing dish comprising a water pan, a food-pan made of sheet metal and provided with an upper surface adapted to support the cover thereof, and a lower surface by which said pan seats on the water pan, the engaging portions of the two pans meeting closely and continuously so as to exclude the issue of steam therebetween, in combination with a long, laterally-extending handle for the food pan formed of a separate piece and permanently engaged with said food pan at two separated points and disposed thereon below the said upper surface which forms the seat for the cover and above the surface by which the food pan rests on the water pan.

2. A cooking utensil consisting of a sheet metal pan having an out-turned flange forming the upper marginal rim of the pan and a skirt depending downwardly from such rim at a distance from the body of the pan, in combination with a handle member projected through an aperture in the said depending skirt and having a bearing against the same, the inner end of the handle member being permanently fastened to the pan interior of said skirt, whereby the said member is provided with two points of bearing upon the pan.

3. A cooking utensil consisting of a sheet-metal pan having an out-turned peripheral flange near the top, a skirt depending from the flange, a handle fitted within an aperture within the skirt, the inner end of the handle being secured against the under surface of the flange and having an offset end portion bearing against the upright wall of the body of the pan.

4. A cooking utensil, consisting of a sheet-metal pan, the side of which is turned outward near the top thereof and then upward to form a bead or rim to the pan, a skirt depending from the upturned portion and a handle piece supported within an aperture in said depending skirt and secured at a separate point against the outer surface of the pan.

5. A chafing dish, comprising a sheet-metal food pan, having an out-turned annular flange near its peripheral edge, a skirt depending from the flange and provided at its edge with an inturned seating lip, and a handle projecting through an aperture in the depending skirt between the flange and the lip and connected at its end portion with the pan body.

6. In a chafing dish, a food pan having an out-turned annular flange near its peripheral edge, a skirt depending from the flange and provided near its edge with an annular seating surface, spaced from the body of the pan, a handle fitted within an aperture in the skirt and fulcrumed on an edge of the aperture and means for permanently securing the end of the handle to the underside of the said out-turned flange.

7. In a chafing dish, a water pan having an out-turned annular flange provided with a peripheral bead raised above said flange, a food pan provided with an out-turned flange and a down-turned skirt having a seating lip adapted for centering engagement with the bead of the water pan and for seating engagement with the said annular flange thereof, in combination with a handle having two separate points of bearing upon the food pan, one of said points being on the down-turned skirt thereof and the other being interior thereof.

In testimony whereof, I have signed this specification in the presence of two witnesses.

LOUIS WOJIDKOW.

Witnesses:
G. A. TAYLOR,
H. S. KIMBALL.

Copies of this patent may be obtained for five cents each, by addressing the "Commissioner of Patents, Washington, D. C."